United States
Shoemaker

[11] 3,997,246

[5] Dec. 14, 1976

[54] MICROSCOPE ILLUMINATOR

[75] Inventor: Arthur H. Shoemaker, East Aurora, N.Y.

[73] Assignee: American Optical Corporation, Southbridge, Mass.

[22] Filed: Dec. 29, 1975

[21] Appl. No.: 644,687

[52] U.S. Cl. .................. 350/189; 350/175 ML; 350/229
[51] Int. Cl.$^2$ .................. G02B 9/12; G02B 19/00
[58] Field of Search ........... 350/189, 235, 91, 229, 350/175 ML

[56] References Cited
UNITED STATES PATENTS 3,421,808  1/1969  Gottlieb .................. 350/175 ML

*Primary Examiner*—John K. Corbin
*Assistant Examiner*—Conrad Clark
*Attorney, Agent, or Firm*—Alan H. Spencer; William C. Nealon; H. R. Berkenstock, Jr.

[57] ABSTRACT

A microscope illuminator having three lenses with the center lens having an axially-symmetrical aspheric rear surface provides good lateral color correction for illuminated fields to 20mm. when used with a condenser having good color correction.

2 Claims, 1 Drawing Figure

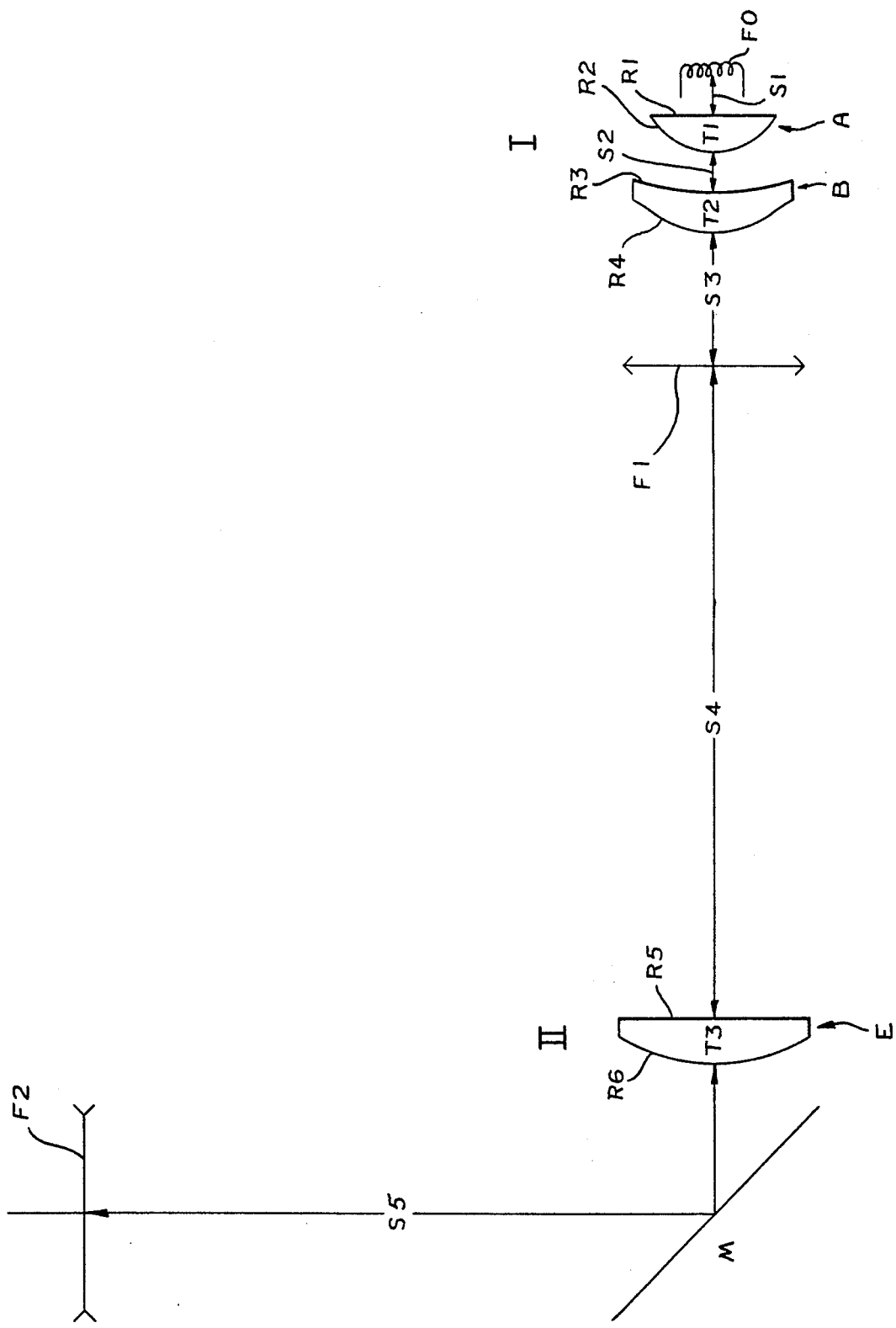

MICROSCOPE ILLUMINATOR

BACKGROUND OF THE INVENTION

This invention relates to an improved microscope illumination system, and in particular to a transmitted light system which provides Kohler illumination for standard 10X through 100X objectives for up to a 20mm. field. Use of the proper "throw-in" lens extends the coverage down to 2.5X objectives for up to a 20mm. field. Those skilled in the art can select and position such a lens.

This system is designed as a simplified replacement for more complex transmitted light systems designed to illuminate a field of more than 20mm. The present system provides a lateral color-free image of the field iris when used with a condenser of the appropriate focal length and color correction.

BRIEF DESCRIPTION OF THE INVENTION AND DRAWING

The present invention is an uncomplex illumination system for a microscope designed to provide illumination when a field of 20mm. or less is satisfactory. The use of a long focal length collimator provides lateral color-free imaging of the field iris when a condenser of good color correction is used. The illumination system operates as follows: Filament F0 is imaged at infinity by collector I. The collimator II reimages the filament in the region of condenser front pupil plane F2. At the same time. collimator II provides an image of field iris F1 at infinity. This system is thus designed for use with an infinity corrected condenser.

FIG. 1 is an optical diagram of the illumination system of the present invention.

DESCRIPTION OF THE PREFERRED EMBODIMENT

As shown in FIG. 1, the system comprises a front collector group I and adjacent filament F0. Rearward of and optically aligned with collector group I is the field iris F1. Rearmost, and also optically aligned, is the collimator II.

The five optically aligned components of the system designated A, B, E, F0 and F1. Mirror M is optional and is used when it is desired to minimize the vertical distance for the system. Collector group I comprises plano-concavo positive singlet A and concavo-convex positive singlet B. The rearmost surface of singlet B, having radius $R_4$, is parabolic. Collimator II comprises plano-concavo positive singlet E. Flat mirror M may be used to divert light 90 degrees. With respect to the lens parameters, the axial thicknesses of successive lens elements are designated $T_1$ to $T_3$, and the successive axial spaces from the filament plane (designated F0) are $S_1$ to $S_6$. The successive lens radii are designated $R_1$ to $R_6$ where the minus sign (−) applies to surfaces whose center of curvature lies on the filament side of their vertices. The refractive indices and Abbe numbers of the glasses in the successive lenses are designated $ND_1$ to $ND_3$ and $\nu_1$ to $\nu_3$ respectively.

Since the numerical aperture and size of the illuminating spot at the object focal plane is directly proportional to the focal length of the condenser, lens parameters are given in Table I in terms of condenser focal length F, which typically varies from about 9.3 to 12.3mm.

TABLE I

| Lens | Radius | Thickness | Spacing | Index of Refraction | Abbe Number |
|---|---|---|---|---|---|
|  |  |  | $S_1$=0.47619F |  |  |
| A | $R_1=\infty$ | $T_1$=0.4762F |  | 1.51<$ND_1$<1.53 | $\nu_1 \approx 59$ |
|  | $R_2$=−0.87362F |  | $S_2$=0.51714F |  |  |
| B | $R_3$=−5.8514F | $T_2$=0.8762F |  | 1.51<$ND_2$<1.53 | $\nu_2 \approx 59$ |
|  | $R_4$=−1.1899F |  | $S_3$=3.1857F |  |  |
|  |  |  | $S_4$=7.6590F |  |  |
| E | $R_5=\infty$ | $T_3$=0.6667F |  | 1.51<$ND_3$<1.53 | $\nu_3 \approx 59$ |
|  | $R_6$= 4.5247F |  | $S_5$= 11.7143F |  |  |

The surface of lens B having radius $R_4$ is an axially-symmetrical, aspheric surface with axis of rotation Z. The value of Z for any given value of x and y is defined by the equation:

$$Z = \frac{cp^2}{1 + \sqrt{1-(k+1)c^2p^2}} + dp^4 + ep^6 + fp^8 + gp^{10}$$

wherein:
 $d, e, f$ and $g$ are zero
 $p^2 = x^2 + y^2$
 $c = 1/R_4$, and
 $k = -1.0$ The numerical values, in millimeters except for ND and $\nu$, for a preferred embodiment for use with a condenser having a focal length F of 10.5mm. are given in Table II.

TABLE II

| Lens | Radius | Thickness | Spacing | Index of Refraction | Abbe Number |
|---|---|---|---|---|---|
|  |  |  | $S_1$=5.00 |  |  |
|  | $R_1=\infty$ |  |  |  |  |

TABLE II-continued

| Lens | Radius | Thickness | Spacing | Index of Refraction | Abbe Number |
|---|---|---|---|---|---|
| A |  | $T_1=5.00$ |  | $ND_1=1.523$ | $\nu_1=58.6$ |
|  | $R_2=-9.173$ |  | $S_2=5.43$ |  |  |
| B | $R_3=-61.440$ | $T_2=9.20$ |  | $ND_2=1.523$ | $\nu_2=58.6$ |
|  | $R_4=-12.494$* |  | $S_3=33.45$ |  |  |
|  |  |  | $S_4=80.42$ |  |  |
| E | $R_5=\infty$ | $T_3=7.00$ |  | $ND_3=1.523$ | $\nu_3=58.6$ |
|  | $R_6=-47.510$ |  | $S_5=123.00$ |  |  |

*Aspheric surface having conic coefficient of −1.0.

What is claimed is:

1. In a microscope illumination system having a filament, a condenser, and a field diaphragm, said condenser having a focal length and a front focal plane, the improvement comprising a collector lens group and a collimator lens E, all aligned on an optical axis, said collector lens group having a plano-concave positive singlet A and a concavo-convex positive singlet B, the parameters of A, B and E being set forth in the following Table where successive lens radii are designated $R_1$ to $R_6$, a minus sign (−) applies to centers of curvature on the filament side of the vertex, successive axial thicknesses are designated $T_1$ to $T_3$, successive axial spaces are designated $S_1$ to $S_5$, indices of refraction are designated $ND_1$ to $ND_3$, Abbe numbers are designated $\nu_1$ to $\nu_3$, indices of refraction and Abbe numbers being absolute values, and wherein F is 9 to 12mm.

| Lens | Radius | Thickness | Spacing | Index of Refraction | Abbe Number |
|---|---|---|---|---|---|
|  |  |  | $S_1=0.47619F$ |  |  |
| A | $R_1=\infty$ | $T_1=0.4762F$ |  | $1.51 < ND_1 < 1.53$ | $\nu_1 \approx 59$ |
|  | $R_2=-0.87362F$ |  | $S_2=0.51714F$ |  |  |
| B | $R_3=-5.8514F$ | $T_2=0.8762F$ |  | $1.51 < ND_2 < 1.53$ | $\nu_2 \approx 59$ |
|  | $R_4=-1.1899F$ |  | $S_3=3.1857F$ |  |  |
|  |  |  | $S_4=7.6590F$ |  |  |
| E | $R_5=\infty$ | $T_3=0.6667F$ |  | $1.51 < ND_3 < 1.53$ | $\nu_3 \approx 59$ |
|  | $R_6=4.5247F$ |  | $S_5=11.71-43F$ |  |  | wherein the surface of lens B having radius of curvature $R_4$ is axially-symmetrical, aspheric surface having a conic coefficient $k$ of −1.0 and deformation coefficients $d$, $e$, $f$ and $g$ of zero.

2. The improvement of claim 1 wherein F is 10.5mm., $ND_1$, $ND_2$ and $ND_3$ are 1.523 and $\nu_1$, $\nu_2$ and $\nu_3$ are 58.6.

* * * * *